UNITED STATES PATENT OFFICE.

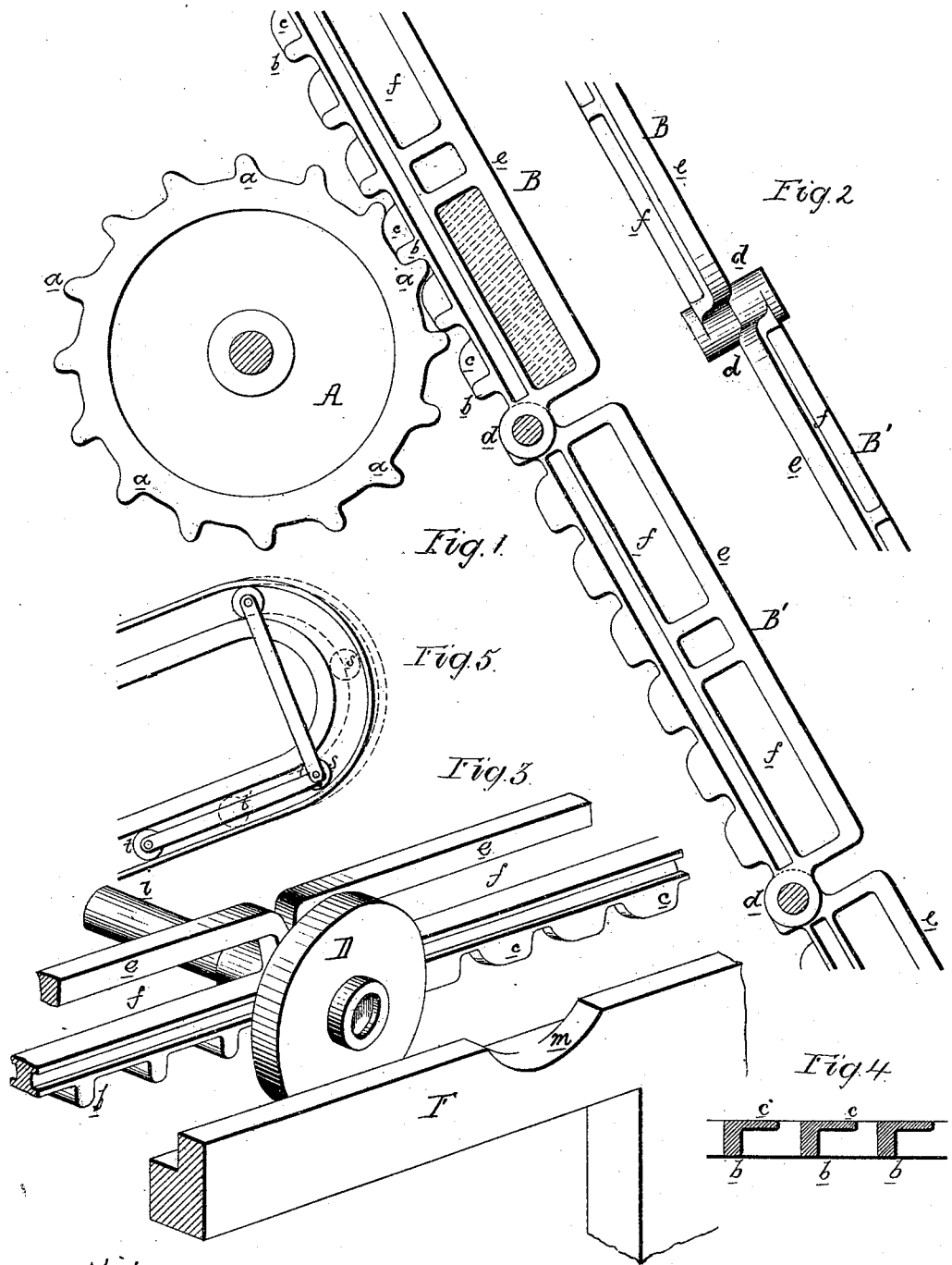

JOHN ELLIS AND NATHAN HOFFMAN, OF EAST COVENTRY, PENNSYLVANIA.

IMPROVEMENT IN ENDLESS-CHAIN HORSE-POWER MACHINES.

Specification forming part of Letters Patent No. 180,331, dated July 25, 1876; application filed April 24, 1876.

*To all whom it may concern:*

Be it known that we, JOHN ELLIS and NATHAN HOFFMAN, of East Coventry, Chester county, Pennsylvania, have invented certain Improvements in Endless-Chain Horse-Power Machines, of which the following is a specification:

Our invention relates to certain improvements in endless-chain horse-power machines, the object of our improvements being to so construct the machine as to effectually utilize the power applied, afford a firmer foothold for the horse, permit the use of foot-boards of uniform length, and facilitate the lubrication of the working parts. This object we attain in the manner which we will now proceed to describe, reference being had to the accompanying drawing, in which—

Figure 1 is a side view of sufficient of a horse-power machine to illustrate our invention; Figs. 2, 3, 4, and 5, detached views of portions of the same.

In Figure 1, A represents one of the gear-wheels of a horse-power machine; and B and B', two connected links of an endless chain, through the medium of which power is applied to the wheel. The teeth $a$ of the wheel A are inclined on one side, and the spaces between the teeth are much larger than usual, in order to admit the joints of the links, these joints being line with the teeth of the links, and being so arranged that each joint forms a tooth, as shown in Fig. 1. Each link has a rib or yoke, $e$, and this rib has two openings, $ff$, each of which receives the end of the narrow foot-board, as shown by dotted lines. Each of the teeth $b$ of the links has at one side a rib, $c$, so formed that each tooth and its rib shall correspond in shape to the joints between the links, and thus form a skeleton tooth which exactly fits the space between the teeth $a$ of the wheel A, which can, consequently, be reversed without shock or jar. The joints between the links are formed by lugs $d$ at the ends of the same. These projections are arranged directly in line longitudinally with, or rather in the same vertical plane as, the bottom bars of their respective links, but the yokes $e$ are bent over, the yoke of one link in one direction, and the yoke of the adjoining link in the opposite direction, so that their top bars, against which shoulders on the foot-boards bear, will be in direct longitudinal line when the links are coupled, as shown in Fig. 2.

By this means foot-boards of a uniform length can be used for all the links, thus obviating the necessity of using the two sets of foot-boards of different lengths, which are required when the links are staggered in the usual manner, while, owing to the fact that the joints $d$ are in line with the bottom bars of the links which have to support the weight, all twisting-strain is removed from the joints, and a serious objection to links in which the joints are formed on one side of the bottom bars thus removed.

The two openings, $ff$, in the rib $e$ of each link are separated by a space equal to the distance between the foot-boards at the joint, this mode of construction permitting the use of narrow foot-boards, which form a tread upon which the horse can obtain a much firmer footing than where the wide boards are used. The endless chain is supported upon anti-friction-rollers D, which are arranged at the junction of the links of the chain, the shafts $i$ of the wheels serving to couple the links together. These rollers run upon the usual L-shaped way F, and, in order to facilitate the lubrication of the journals of the rollers, we form in the upper edge of the way one or more recesses, $m$, into which the rollers can be moved laterally, thus exposing the wearing-surfaces of the journals, after lubricating which the rollers can be moved back into place.

It will be evident that by inclining the teeth of the wheel A, as shown, their tendency to be drawn out of gear is counteracted, thus obviating a serious objection to ordinary teeth. This tendency of the teeth to be drawn out of gear is still further counteracted by depressing the joints between the links so that they are in the same horizontal plane as the teeth, a more direct draft of the same upon the teeth of the gear-wheel being also insured by this arrangement.

Another feature of our invention is shown in Fig. 5, and consists in forming the curved portions of the track at each end of the horse-power slightly elliptical, instead of semicircular, as usual. The object of this arrangement is to prevent the sudden slacking in the speed of a roller while that in advance is turning the curve, which is the result when the curve is semicircular. Thus the roller $s$, in moving from the position shown in full lines to that shown by the dotted lines $s'$, causes a movement of the roller $t$ to the position shown by dotted lines $t'$, which is less than the distance traversed by said rollers $s$, so that the movement of the roller $t$ is considerably slower than that of the roller $s$, and, consequently, a shock is imparted to the lengths of chain following it.

By making the curved portion of the track of an elliptical or other equivalent shape this curved portion of the track is lengthened, and the above evils are obviated.

We claim as our invention—

1. In endless-chain horse-power machines, a gear-wheel in which the teeth are inclined, substantially as set forth.

2. An endless-chain horse-power machine, in which the links of the chain are connected together by joints arranged in the same horizontal plane as the teeth of the links, and so constructed that each joint forms a tooth, all substantially as described.

3. The combination, in an endless-chain horse-power machine, of a series of narrow foot-boards with links B B', each having openings $f\,f$, to each of which the end of a separate foot-board is adapted, substantially as described.

4. The combination of links B B', &c., having lugs $d$ arranged in the same vertical plane as the bottom bars of their respective links, with the yokes $e$ so bent that when the links are coupled the top bars $e$ of the yokes will be in line longitudinally, as set forth.

5. The links B, having teeth $b$ and ribs $c$, forming skeleton teeth, as described.

6. The combination of the chain and its rollers D with the way F and its recess or recesses $m$.

7. In horse-power machines, the combination of the jointed links B and the wheels D at the joints with an endless track, the connecting ends of which are made on a curve of elliptical form, as and for the purpose set forth.

In testimony whereof we have signed our names to this specification in the presence of two subscribing witnesses.

JOHN ELLIS,
NATHAN HOFFMAN.

Witnesses:
HARRY SMITH,
ELLWOOD T. DEETZ.